Patented July 7, 1942

2,288,866

UNITED STATES PATENT OFFICE 2,288,866

TREATMENT OF HYDROCARBONS

Han Hoog, Amsterdam, Netherlands, assignor to Shell Development Company, San Francisco, Calif., a corporation of Delaware No Drawing. Application March 11, 1940, Serial No. 323,408. In the Netherlands April 17, 1939

17 Claims. (Cl. 260—668)

This invention relates to the treatment of hydrocarbon distillates. More particularly, the invention relates to the treatment of naphthenic hydrocarbon distillates with contact masses having dehydrogenating properties. Particular aspects of the invention relate to the catalytic treatment of hydrocarbon distillates to effect reforming, desulphurization, dehydrogenation, cyclization and aromatization thereof.

An object of the invention is to provide a means whereby the efficiency of various catalytic treatments of hydrocarbon distillates may be improved and such processes made more economical.

In the conversion of petroleum and other carbonaceous materials into gasoline, kerosene, solvents, and the many other hydrocarbon products, an infinite variety of hydrocarbon distillates or stocks of different boiling ranges and properties are encountered. The differences in properties of the various distillates or stocks depend upon the molecular weights, ratios, and types of the various hydrocarbon constituents. In nearly all cases, commercial hydrocarbon fractions produced from petroleum, shale oil, synthesis, etc., are not pure hydrocarbons nor even composed of hydrocarbons of any one type, but are complex mixtures of hydrocarbons in which all of the main hydrocarbon types, i. e., paraffinic, olefinic, naphthenic, and aromatic hydrocarbons are present to a certain extent. In view of the variety of properties of the various distillates, some are obviously more valuable than others. Those having the desired characteristics are utilized per se; those having less desirable properties, although they make up the greater portion of the total, are not generally discarded since they may usually be improved or converted into more desirable products by suitable treatments.

In the endeavor to produce the maximum amount of products having the most value from any given source of hydrocarbon, the industry has developed numerous treatments in which various conversions, rearrangements, syntheses, etc., are effected under controlled conditions with the aid of various solid catalysts. In a number of these processes, for instance, catalytic dehydrogenation, catalytic cracking, catalytic reforming, catalytic cyclization, catalytic desulphurization, catalytic aromatization, etc., contact masses having dehydrogenating properties are employed.

The various treatments of these hydrocarbon distillates with contact masses having dehydrogenating properties, although well developed and generally recognized as highly desirable, suffer from certain disadvantages which in many cases prevent their economical application at the present time. The main disadvantage encountered in all of these processes is the necessity of frequently reactivating, and in some cases replacing, the contact mass. In all of these processes the active life of the contact mass is relatively short, sometimes as short as a few minutes. In most cases the catalytic mass, after its activity has declined to an arbitrarily set minimum, may be reactivated in situ by passing an oxidizing reactivating fluid therethrough. These reactivating treatments, however, must be carefully controlled, are expensive in themselves, require the process to be executed intermittently, cause loss of material, and consume a considerable amount of time. In such cases where reactivation of the contact mass is not possible or economical, the contact mass must be replaced at regular intervals and this is usually uneconomical unless the catalyst life is unusually long.

In view of these circumstances, the whole difference between an economical process and an uneconomical one, when dealing with the treatment of hydrocarbon fractions with contact masses having dehydrogenation properties, often depends upon the frequency and difficulty with which the contact mass must be reactivated and/or replaced when employing any particular stock. At present, certain stocks may be economically processed by these methods while other almost identical stocks from different sources cause a rapid decline in the activity of the contact mass and cannot be economically treated. Very little has been known as to the reasons for the different behaviors of apparently similar stocks. Except for a few generalizations these differences in behavior have been ascribed in most cases to traces of sulphurous impurities, peroxides, nitrogen bases, etc., which are known to be invariably present in commercial hydrocarbon distillates.

I have made an extensive investigation into the behavior of various hydrocarbon distillates in processes involving the use of dehydrogenating contact masses and have discovered a means whereby the treatment of various hydrocarbon stocks in these several processes may be made more efficient and economical. According to the present invention, hydrocarbon distillates to be treated in any of the various processes employing dehydrogenating contact masses are pretreated to effect certain changes therein. When employing distillates which have been subjected to a suitable pretreatment, I have found that the efficiency of the various dehydrogenating contact masses decreases much more slowly, higher conversions are obtained, the contact mass requires reactivation or replacement less frequently, and the various processes may be carried out more economically. Not only are the several processes carried out more economically with presently used hydrocarbon stocks, but numerous stocks which hitherto could not be economically treated can be profitably employed.

It is known that nearly all of the commercial hydrocarbon distillates, such as are subjected to various treatments with dehydrogenating contact masses, contain a certain amount of naphthenic hydrocarbons, the content of which depends upon the source of the material and its previous treatment, and may range from traces up to nearly 100%. The naphthenic hydrocarbons present in these stocks are nearly always composed of naphthenic hydrocarbons of all types ranging from those having three-membered rings up to those having seven- and eight-membered rings. Of the various naphthenic hydrocarbons, those having five- and six-membered rings nearly always predominate. Naphthenic hydrocarbons having six-membered rings (i. e. are hydro-aromatic) are very desirable since they may be easily dehydrogenated to give aromatic hydrocarbons. I have found, however, that those naphthenic hydrocarbons which are non-hydroaromatic cycloparaffins (i. e., contain other than six-membered rings) when present in hydrocarbon distillates treated with contact masses having dehydrogenating properties, materially decrease the efficiency of the process, and that by removing said non-hydroaromatic naphthenes the efficiency of these processes are materially increased. As examples of non-hydroaromatic naphthenes may be mentioned cyclobutane, cyclopentane, cycloheptane, and their alkylated derivatives. Of these detrimental naphthenes, those containing five-membered rings, which usually make up about one-half of the total naphthene content in commercial distillates, have been found to be by far the most harmful.

The process of my invention therefore comprises subjecting the hydrocarbon distillate to two treatments, first, to decrease the concentration of non-hydroaromatic naphthenes therein and, second, to one of the usual treatments employing a solid contact mass having dehydrogenating properties.

The present process may be advantageously applied to the treatment of any of the common petroleum distillates which are otherwise suitable for application in the various processes employing dehydrogenating contact masses, and which contain about two or more percent of non-hydroaromatic naphthenes. Such hydrocarbon distillates are hereinafter simply referred to as naphthenic distillates. Thus, naphthenic distillates boiling predominantly between about 40 and 205° C. are well-suited. Since the process is, in general, the more advantageous the higher the non-hydroaromatic naphthene content, it is exceptionally advantageous for the treatment of naphthenic distillates containing a substantial proportion of hydrocarbons boiling between about 50° C. and 150° C. It is within this range that the detrimental non-hydroaromatic naphthenes are usually the most concentrated.

The treatment of various naphthenic distillates to decrease the content of non-hydroaromatic naphthenes prior to the catalytic treatment proper may be effected in any one of a number of ways. In certain cases, for example, it is possible to subject the naphthenic distillate to a treatment whereby the non-hydroaromatic naphthenes are selectively reacted with a chemical agent, after which they may be removed in any one of the appropriate conventional ways. In certain cases it is also possible to decrease the content of non-hydroaromatic naphthenes by carefully controlled azeotropic distillation, selective extraction, etc. Another method for decreasing the content of non-hydroaromatic naphthenes which may be advantageously employed is to subject the distillate to a ring-splitting treatment, to convert the non-hydroaromatic naphthenes to open-chain paraffin hydrocarbons. This may be effected by treating the distillate with hydrogen and platinum-on-carbon catalyst at a temperature of 290 to 350° C.

While the above-mentioned methods, as well as others which will be apparent to those skilled in the art, are capable of effecting the desired decrease in the non-hydroaromatic naphthene content when properly and specifically executed for this purpose, a much more practical, economical and efficient treatment may be effected by making use of certain isomerization reactions. The various hydroaromatic naphthenes and non-hydroaromatic naphthenes, when treated under suitable conditions in the presence of a suitable catalyst, undergo isomerization. Thus, the alkylated cyclopentanes undergo reversible isomerization to alkylated cyclohexanes. Methyl cyclopentane, for example, which is nearly always present in considerable amounts in all naphthenic distillates containing substantial proportions of hydrocarbons boiling in the range of 70 to 90° C. and is one of the most detrimental of the non-hydroaromatic naphthenes, isomerizes according to the equation:

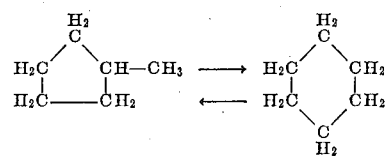

It is found that the equilibrium concentration in these various isomerization reactions is strongly on the side of the hydroaromatic naphthenes. Thus, by isomerization, the non-hydroaromatic naphthenes in naphthenic distillates may, in general, be reduced to a small fraction of the hydroaromatic naphthene content. Methyl cyclopentane, for example, may be converted about 85% to cyclohexane.

By subjecting the naphthenic distillate to a suitable isomerization treatment, the content of non-hydroaromatic naphthenes is reduced in a most efficient and practical manner. This method has the advantage over other methods for reducing the concentration of non-hydroaromatic naphthenes in that the undesirable non-hydroaromatic naphthenes are not destroyed or removed, but are converted to a large extent into hydroaromatic naphthenes which, upon subsequent treatment in the presence of a contact mass having dehydrogenating properties, are converted to valuable aromatic hydrocarbons.

The isomerization of non-hydroaromatic naphthenes in naphthenic distillates to hydroaromatic naphthenes may be effected by contacting the distillate at a suitable temperature with an acid-acting metal halide isomerization catalyst, a hydrogen halide, and, if desired, hydrogen. Of the various acid-acting metal halide catalysts, aluminum chloride is by far the most efficient and preferred. Other acid-acting metal halide catalysts such as the halides of Zr, Ta, Ga, Be, Nb, Sb, In, Sn, Cd, Co, Tl, Zn, B, and Cu, may also, be employed, if desired in conjunction with $AlCl_3$ or $AlBr_3$.

The aluminum chloride, if this catalyst is used, may be employed in any one of several ways. One suitable method of employing this catalyst is to suspend the powdered anhydrous aluminum chloride in the reaction mixture. For this method of operation, the reaction system described in copending application Serial No. 298,594, filed October 9, 1939, may be advantageously employed.

The aluminum chloride may also be advantageously employed in the form of a contact mass comprising an adsorptive carrier material impregnated with anhydrous aluminum chloride. The aluminum chloride may also, if desired, be employed in the form of an oily complex addition compound, such as a Gustavson complex.

In general, the isomerization treatment is executed most efficiently at a temperature between about 40° C. and 130° C. If the isomerization is executed in the presence of a sufficient concentration of hydrogen, however, temperatures as high as about 200° C. may often be employed.

The isomerization treatment is preferably executed in the presence of at least a small amount of free hydrogen halide, for instance HCl. When executing the reaction in the liquid phase, however, pressures of HCl equivalent to at least one atmosphere and preferably at least three atmospheres of HCl (as measured at 25° C.) give much superior results.

The isomerization treatment of naphthenic distillates to decrease the concentration of non-hydroaromatic hydrocarbons therein is particularly advantageous when applied to naphthenic distillates, such as the straight-run distillates from naphthenic crudes, which are substantially free of olefin and aromatic hydrocarbons. Olefins and aromatic hydrocarbons, if present in the naphthenic distillate in appreciable quantities, detract from the efficiency of the isomerization treatment in that they tend to react to a certain extent under the usual conditions to form undesirable higher molecular weight products. If aromatics are present in substantial amounts in the naphthenic distillate, it is usually necessary to execute the isomerization reaction at a temperature below about 100° C., for instance at about 80° C.

Suitable methods for effecting the isomerization of naphthenic distillates are described in copending applications Serial No. 323,409, filed March 11, 1940, and Serial No. 323,410, filed March 11, 1940.

The naphthenic distillates treated as above described to decrease the concentration of non-hydroaromatic naphthenes, when used in the various processes employing contact masses having dehydrogenating properties, are found to yield much better results. The efficiency of the contact mass is found to decline at a much slower rate, better conversions are obtained, and the contact mass requires much less frequent reactivation and/or replacement. This allows these various processes to be executed much more efficiently and economically. The treatment of naphthenic distillates to decrease the concentration of non-hydroaromatic naphthenes therein is advantageous in any process where it is desired to treat a naphthenic distillate with a contact mass having dehydrogenating properties. This is believed to be due to the fact that the particular non-hydroaromatic naphthenes which are removed or converted into hydroaromatic naphthenes by the pretreatment are particularly susceptible in some manner to contact materials having dehydrogenating properties. I have found, for example, that whereas these undesirable non-hydroaromatic naphthenes are, in general, quite stable thermally, they react easily in the presence of various contact materials when these have dehydrogenating properties and the contact mass is soon coated with dark tarry deposits. This may be one of the reasons for their detrimental effect when present in naphthenic distillates treated with such contact materials.

Various processes in which contact masses having dehydrogenating properties are often employed and in which naphthenic distillates pretreated as described are particularly advantageous are, for example, catalytic reforming, catalytic desulfurization, catalytic aromatization, and certain types of catalytic cracking. The naphthenic distillates, after being treated to decrease the concentration of non-hydroaromatic naphthenes therein, are employed in these or other processes wherein contact masses having dehydrogenating properties are employed, in their respective conventional manners. The various contact materials which possess dehydrogenating properties and are used in these various processes are well known to those skilled in the art. These various dehydrogenating contact materials, which are too numerous to mention, are disclosed and described in the numerous patents and scientific articles relating to the respective processes.

The following examples which are not intended to limit the invention in any manner, are presented to illustrate various aspects of the invention and promote a better understanding and appreciation thereof.

A typical isomerization reaction in which a non-hydroaromatic naphthene is converted predominantly into a hydroaromatic naphthene is illustrated in the following Examples I and II:

*Example I*

Methyl cyclopentane was treated with 5% by weight of anhydrous aluminum chloride and 16% by weight of HCl at 20° C. for 10 hours. The product contained approximately 80% cyclohexane and 11% methyl cyclopentane.

*Example II*

Methyl cyclopentane was charged, along with 6% by weight of anhydrous $AlCl_3$, 20% by weight of HCl and 30 atmospheres pressure of hydrogen, into a steel autoclave and treated for 10 hours at about 80° C. The product consisted approximately of

| | Percent |
|---|---|
| Hexane | 2.5 |
| Methyl cyclopentane | 23.5 |
| Cyclohexane | 74.0 |

The decrease in the concentration of non-hydroaromatic naphthenes in hydrocarbon mixtures by isomerization is illustrated in the following Examples III, IV, and V:

*Example III*

A synthetic hydrocarbon fraction containing 50% by weight of methyl cyclopentane and 50% by weight of heptane was treated with 5% by weight of anhydrous aluminum chloride and 10% by weight of HCl under 50 atmospheres pressure of hydrogen at 20° C. for ten hours. The product consisted approximately of

| | Percent |
|---|---|
| Heptane | 47.1 |
| Methyl cyclopentane | 10.5 |
| Cyclohexane | 41.1 |

Example IV

A synthetic hydrocarbon fraction containing 20% by weight of methyl cyclopentane and 80% by weight of heptane was treated with 5% by weight of anhydrous $AlCl_3$ and 5% by weight of HCl under 40 atmospheres pressure of hydrogen for 5 hours at about 100° C. The product consisted approximately of

| | Percent |
|---|---|
| Heptane | 77.2 |
| Methyl cyclopentane | 3.5 |
| Cyclohexane | 17.2 |

The improvements and advantages realizable by pretreating naphthenic distillates to decrease the concentration of non-hydroaromatic naphthenes therein prior to subjecting them to the treatment with a contact material having dehydrogenating properties are illustrated in the following Examples V–XI:

Example V

A 60–150° C. fraction from an East Texas crude was treated for 10 hours at about 80° C. with about 3% by weight of anhydrous $AlCl_3$, about 10% by weight of HCl, and about 50 atmospheres pressure of hydrogen. The content of non-hydroaromatic naphthenes in this distillate, although small, was decreased and the product, after washing and drying, showed improved results when reformed in the conventional manner with a dehydrogenating catalyst containing chromium oxide.

Example VI

A series of comparable experiments were made in which hydrocarbon mixtures containing varying amounts of non-hydroaromatic naphthenes, with and without a preliminary isomerization treatment, were subjected to a catalytic cyclization treatment. The isomerization was in each case effected by treating the naphthene-containing material with 5% by weight of $AlCl_3$ and 10% by weight of HCl for 10 hours at 20° C. under 20 atmospheres pressure of hydrogen. A separate charge of fresh cyclizing catalyst was used for each material treated. The activities of the catalysts at the end of six hours of continuous operation with the respective feed stocks are expressed in arbitrary units in the following table. Those for the original feed are given in column I while those for the feed which had been first isomerized are given in column II.

| Feed | Activity | |
|---|---|---|
| | I | II |
| (1) 100% n-heptane | 1,620 | |
| (2) 95% n-heptane+5% methyl cyclopentane | 1,180 | 1,500 |
| (3) 90% n-heptane+10% methyl cyclopentane | 840 | 1,420 |
| (4) 80% n-heptane+20% methyl cyclopentane | 600 | 1,000 |

It is seen that in all cases the activity of the catalyst was materially improved by the isomerization treatment.

Example VII

A hydrocarbon fraction consisting of approximately 90% by weight n-heptane and 10% by weight methyl cyclopentane was treated at 465° C. and a contact time of approximately 16 seconds with a pilled catalyst consisting of $Al_2O_3$ and $Cr_2O_3$ in a mol ratio of 30:70, and 5% by weight of potassium in the form of KOH. The activity of the catalyst showed a marked decline at the end of 3 hours of continuous use and the conversion to aromatic hydrocarbons, measured over a 6-hour period, was approximately 18.2% by weight.

A portion of the hydrocarbon fraction was then treated for 10 hours at room temperature in an autoclave with 5% by weight $AlCl_3$ and 10% by weight HCl under a pressure of 20 atmospheres of hydrogen. After decantation from the $AlCl_3$, the reaction product was washed and dried and this product was treated in the same way as described above. Measured over a period of 6 hours of continuous operation, the conversion to aromatic hydrocarbons was found to have increased to approximately 30.1% by weight, and the catalyst at the end of this time was found to have not yet suffered any appreciable loss in activity.

Example VIII

An 85 to 110° C. naphthenic hydrocarbon fraction from a Roumanian crude was treated with a catalyst of the same composition as that described in Example VII. The activity of the catalyst declined to approximately half of the maximum activity in about 2 hours of continuous operation.

When the hydrocarbon fraction was first treated for 10 hours at 80° C. in an autoclave with 1% by weight of $AlCl_3$ and 10% by weight HCl under a pressure of 50 atmospheres of hydrogen, the maximum activity of the catalyst increased 50%, and after 6 hours of continuous operation no reduction in the catalytic activity had taken place.

Example IX

A Borneo gasoline, boiling between 85 and 104° C. and containing approximately 74% by weight naphthenes, 3% by weight aromatics and 23% by weight paraffins (all percentages by weight), was treated for 10 hours at 80° C. in a rotating $V_2A$ steel autoclave with 5% by weight of $AlCl_3$ and 13% by weight of HCl, such with a view to converting the greater part, namely about 80 to 85%, of the non-hydroaromatic naphthenes present into hydroaromatic naphthenes. After removal of $AlCl_3$ and HCl with lye and water, the reaction product was dried. The treated gasoline contained approximately 73% by weight naphthenes, 2% by weight aromatics, and 25% by weight paraffins.

The gasoline thus pretreated was then passed together with a 10 molar quantity of hydrogen (about 2400 l. per kg. gasoline) and at an absolute pressure of 6 atmospheres over a catalyst in the form of tablets of about ½ cm. diameter. The catalyst consisted of a mixture of 30 mol % $Al_2O_3$ and 70 mol % $Cr_2O_3$, obtained through the coprecipitation of the hydroxides, to which precipitated mixture 16 mols of potassium (in the form of KOH) had been added per 100 mols oxide mixture.

During the first 18 hours the reaction temperature was 525° C., during the following 9 hours the temperature was raised to 535° C., and during the next 6 hours the temperature was raised to 545° C. The catalyst was then regenerated with steam for 5 hours at 650° C. and at an absolute pressure of 6 atmospheres. The original activity of the catalyst was completely restored.

The reaction products obtained during the three runs were mixed. From 498 g. initial material (gasoline treated with AlCl₃ and HCl) a total yield of 447 g. of liquid product was thus obtained. The product consisted of approximately 17% naphthenes, 68% aromatics, 10% paraffins and 5% aliphatic olefines.

*Example X*

A fraction of a Venezuelan straight-run gasoline containing 5-ring naphthenes and boiling between 85 and 110° C., was dehydrogenated in the presence of added hydrogen over a tungsten sulphide catalyst at 475° C. and 50 atmospheres pressure. The rate of passage of the gasoline was 1.20 kg./litre catalyst/hour and that of the hydrogen was 2500 litres/kg. gasoline. The reaction product contained 36% by weight aromatic hydrocarbons, whereas the initial material contained only 6% by weight aromatics. After only 100 catalyst hours the activity curve of the catalyst showed a decrease: the aromatic content of the dehydrogenated gasoline dropped to 32% by weight.

4% by weight of gaseous HCl was then dissolved in a portion of the same Venezuelan gasoline fraction, whereupon the gasoline was forced at a rate of 1 litre per hour and under a pressure of 15 atmospheres through a 2 litre reactor containing 500 g. aluminum chloride and maintained at a temperature of 80° C. The reaction product formed was washed with lye and with water and dried. The hydrocarbon mixture thus obtained, in which the content of 5-ring naphthenes had been reduced from 20% to 8% by weight and which contained about 45% by weight hydroaromatic hydrocarbons, was then dehydrogenated under equal conditions over the tungsten sulphide catalyst which had already been used for 200 hours for the primary experiments. The product contained 42.5% by weight aromatic hydrocarbons at the beginning; after 100 hours the aromatic content rose to 46% by weight and subsequently remained constant.

*Example XI*

A fraction of a straight-run gasoline from a Venezuelan crude boiling between 85° C. and 104° C., and consisting approximately of

| | Per cent |
|---|---|
| Aromatic hydrocarbons | 6 |
| Hydroaromatic naphthenes | 29 |
| Non-Hydroaromatic naphthenes | 25 |
| Paraffinic hydrocarbons | 40 | was treated as follows: 4% of anhydrous HCl was dissolved in the distillate and the mixture forced at a rate of 1 liter per hour under a pressure of about 15 atmospheres through a 2 liter stirring autoclave containing 500 grams of aluminum chloride and maintained at a temperature of 80° C. After treating about 140 liters, small quantities of aluminum chloride were intermittently added to the autoclave to maintain the catalytic activity. At the very beginning, a portion of the small amount of aromatic hydrocarbons contained in the feed was consumed to produce complex compounds of the Gustavson type with the aluminum chloride. The product, after washing with caustic, washing with water, and drying, consisted approximately of

| | Per cent |
|---|---|
| Aromatic hydrocarbons | 6 |
| Hydroaromatic naphthenes | 46 |
| Non-hydroaromatic naphthenes | 8 |
| Paraffinic hydrocarbons | 40 |

This fraction was passed with a throughput of 0.38 kg. per liter of catalyst per hour over a catalyst consisting of a mixture of 30 mol % Al₂O₃ and 70 mol % Cr₂O₃, compressed to grains of about 5 mm. diameter, and also containing 4½% by weight potassium in the form of KNO₃. At the same time hydrogen was passed over at a rate of 2400 liters per kg. gasoline fraction. The total pressure was 5 atmospheres and the partial pressure of the hydrocarbons was 0.45 atmospheres. The reaction temperature during the first six hours was 525° C., during the following six hours 540° C., and during the last six hours 560° C.

The initial gasoline fraction contained 6% by weight aromatics, 40% by weight paraffins and 54% by weight naphthenes. During the first six hours a liquid reaction product was obtained in a yield of 92% which contained 79% by weight aromatics. During the following six hours a liquid product containing 83% by weight aromatics was obtained in a yield of 86% by weight. During the last six hours a liquid reaction product containing 82% by weight aromatics was obtained in a yield of 79% by weight. The catalyst after a long period of use, recovered its original activity when reactivated with steam for three hours at 650° C.

The above examples, which illustrate various aspects of the invention, are not to be construed as limiting the invention. It is to be understood that modifications will be apparent to those skilled in the art and that no limitations are intended other than those imposed by the scope of the appended claims.

I claim as my invention:

1. In a process for the treatment of naphthenic petroleum distillates boiling predominantly between 40° C. and 205° C. and comprising paraffinic hydrocarbons and naphthenic hydrocarbons of non-hydroaromatic character wherein the naphthenic petroleum distillate is subjected to a treatment at an elevated temperature with a solid contact mass having dehydrogenating properties, the improvement which comprises first removing naphthenic hydrocarbons of non-hydroaromatic character from the naphthenic petroleum distillate prior to said catalytic treatment.

2. A process for the treatment of naphthenic petroleum distillates boiling predominantly between 40° C. and 205° C. and comprising paraffinic hydrocarbons and naphthenic hydrocarbons of non-hydroaromatic character which comprises the combination of steps of removing naphthenic hydrocarbons of non-hydroaromatic character and then subjecting the distillate to a treatment at an elevated temperature with a solid contact mass having dehydrogenating properties.

3. A process for the treatment of naphthenic petroleum distillates boiling predominantly between 50° C. and 150° C. and comprising paraffinic hydrocarbons and naphthenic hydrocarbons of non-hydroaromatic character which comprises the combination of steps of removing naphthenic hydrocarbons of non-hydroaromatic character and then subjecting the distillate to a treatment at an elevated temperature with a solid contact mass having dehydrogenating properties.

4. A process according to claim 2 wherein naphthenic hydrocarbons of non-hydroaromatic character are removed by subjecting the naphthenic distillate to a catalytic isomerization treatment.

5. A process according to claim 3 wherein naphthenic hydrocarbons of non-hydroaromatic character are removed by subjecting the naphthenic distillate to a catalytic isomerization treatment.

6. A process for the treatment of naphthenic petroleum distillates boiling predominantly between 40° C. and 205° C. and comprising paraffinic hydrocarbons and naphthenic hydrocarbons of non-hydroaromatic character which comprises the combination of steps of removing naphthenic hydrocarbons of non-hydroaromatic character and then subjecting the distillate to a catalytic reforming treatment with a solid contact mass having dehydrogenating properties.

7. A process according to claim 6 wherein naphthenic hydrocarbons of non-hydroaromatic character are removed by subjecting the naphthenic distillate to a catalytic isomerization treatment.

8. A process for the treatment of naphthenic petroleum distillates boiling predominantly between 50° C. and 150° C. and comprising paraffinic hydrocarbons and naphthenic hydrocarbons of non-hydroaromatic character which comprises the combination of steps of removing naphthenic hydrocarbons of non-hydroaromatic character and then subjecting the distillate to a catalytic reforming treatment with a solid contact mass having dehydrogenating properties.

9. A process according to claim 8 wherein naphthenic hydrocarbons of non-hydroaromatic character are removed by subjecting the naphthenic distillate to a catalytic isomerization treatment.

10. A process for the treatment of naphthenic petroleum distillates boiling predominantly between 40° C. and 205° C. and comprising paraffinic hydrocarbons and naphthenic hydrocarbons of non-hydroaromatic character which comprises the combination of steps of removing naphthenic hydrocarbons of non-hydroaromatic character and then subjecting the distillate to a catalytic reforming treatment under cyclizing conditions with a solid contact mass having dehydrogenating and cyclizing properties.

11. A process according to claim 10 wherein naphthenic hydrocarbons of non-hydroaromatic character are removed by subjecting the naphthenic distillate to a catalytic isomerization treatment.

12. A process for the treatment of naphthenic petroleum distillates boiling predominantly between 40° C. and 205° C. and comprising paraffinic hydrocarbons and naphthenic hydrocarbons of non-hydroaromatic character which comprises the combination of steps of removing naphthenic hydrocarbons of non-hydroaromatic character and then subjecting the distillate to a catalytic reforming treatment with a solid contact mass comprising chromium oxide and alumina.

13. A process for the treatment of naphthenic petroleum distillates boiling predominantly between 40° C. and 205° C. and comprising paraffinic hydrocarbons and naphthenic hydrocarbons of non-hydroaromatic character which comprises the combination of steps of removing naphthenic hydrocarbons of non-hydroaromatic character and then subjecting the distillate to a catalytic reforming treatment with a solid contact mass comprising tungsten sulfide.

14. A process according to claim 12 wherein naphthenic hydrocarbons of non-hydroaromatic character are removed by subjecting the naphthenic distillate to a catalytic isomerization treatment.

15. A process according to claim 13 wherein naphthenic hydrocarbons of non-hydroaromatic character are removed by subjecting the naphthenic distillate to a catalytic isomerization treatment.

16. A process for the treatment of naphthenic petroleum distillates boiling predominantly between 40° C. and 205° C. and comprising paraffinic hydrocarbons and naphthenic hydrocarbons of non-hydroaromatic character which comprises the combination of steps of removing naphthenic hydrocarbons of non-hydroaromatic character and then subjecting the distillate to a catalytic desulfurization treatment at an elevated temperature with a solid contact mass having dehydrogenating properties.

17. A process for the treatment of naphthenic petroleum distillates boiling predominantly between 50° C. and 150° C. and comprising paraffinic hydrocarbons and naphthenic hydrocarbons of non-hydroaromatic character which comprises the combination of steps of removing naphthenic hydrocarbons of non-hydroaromatic character and then subjecting the distillate to a catalytic desulfurization treatment at an elevated temperature with a solid contact mass having dehydrogenating properties.

HAN HOOG.